MAGNETIC CORE MULTIVIBRATOR HAVING VARIABLE RESET MEANS

Filed May 13, 1958 2 Sheets-Sheet 1

*INVENTOR*
AYHAN HAKIMOGLU
*BY*
Francis V. Giolma
ATTORNEY

May 8, 1962 A. HAKIMOGLU 3,034,072

MAGNETIC CORE MULTIVIBRATOR HAVING VARIABLE RESET MEANS

Filed May 13, 1958 2 Sheets-Sheet 2

United States Patent Office 3,034,072
Patented May 8, 1962

3,034,072

MAGNETIC CORE MULTIVIBRATOR HAVING VARIABLE RESET MEANS

Ayhan Hakimoglu, Apalachin, N.Y., assignor to International Business Machines Corporation, New York, N.Y., a corporation of New York Filed May 13, 1958, Ser. No. 734,976
3 Claims. (Cl. 331—113)

Figure 4:
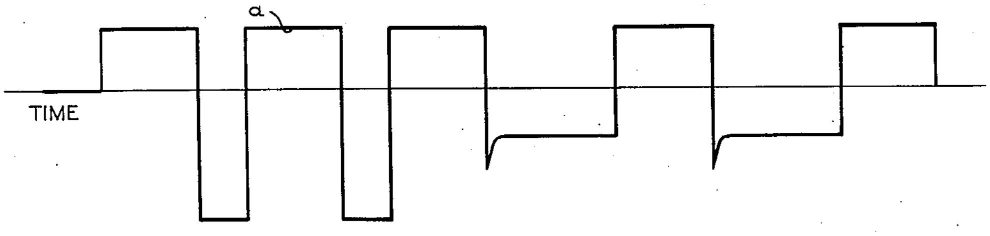

This invention relates generally to magnetic amplifiers, and it has reference in particular to a magnetic multivibrator amplifier.

While magnetic amplifiers having a conventional S-shaped characteristic hysteresis loop core material, may be considered as responsive to the particular value of magnetizing current in a winding on the core, complete saturation is obtained at relatively low values of magnetization current with core materials of the rectangular loop type, such as Orthonol, Deltamax, etc., having compositions on the order of 50 percent nickel and 50 percent iron. With such rectangular loop characteristics, the level of magnetization does not appear to be directly determined by the magnetomotive force applied to the core by the windings on the core, since the rectangular loop characteristic destroys any single-valued dependency between flux and ampere turns. However, it has been found that the magnetization level can be determined by the time integral of the reactive voltage across the winding. Thus, the control or independent variable is rather in the nature of a voltage than a current, and the magnetization level can be ascertained from the equation $$e = \frac{-Nd\phi}{dt}$$

the flux $\phi$ being equal to $$-\frac{1}{N}edt$$

where $e$ equals the reactive voltage and N the number of turns in the winding.

Although magnetic amplifiers of various types have been known in the art, and multivibrators have been devised using current control of the frequency thereof, it has been found that by utilizing a substantially rectangular hysteresis loop, magnetic core material with switch means for controlling the energization of an input winding, and applying a variable control voltage to vary the reactive voltage of an opposing reset winding so that it drives the core to negative saturation at different rates, a free-running magnetic multivibrator can be produced having a substantially constant volt-second positive output pulse, and a variable duration negative pulse or reset time, which proves extremely suitable for many applications, such as, for example, a variable direct current voltage supply.

It is therefore an object of this invention to provide a magnetic multivibrator amplifier that is simple and inexpensive to manufacture and is reliable and efficient in operation.

Another object of this invention is to provide a magnetic multivibrator amplifier having a readily controllable output.

Yet another object of the invention is to provide for readily controlling the operation of a magnetic multivibrator by means of a variable reset control voltage.

It is also an object of this invention to provide in a magnetic amplifier multivibrator for controlling the height and length of the reset portion of the output pulse characteristic, without materially affecting the shape or area of the positive or saturating portion.

Still another object of this invention is to provide for using a transistor for switching the connection of an input winding of a magnetic multivibrator amplifier, and for applying a control voltage to another winding of the magnetic multivibrator for selectively determining the frequency of the positive output pulses from an operating winding thereof.

Other objects of the invention will be pointed out in the following description and claims, and illustrated in the accompanying drawings, which disclose, by way of examples, the principle of the invention and the best mode, which has been contemplated, of applying that principle.

Figure 2:
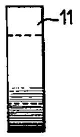
Figure 3:
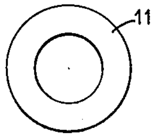
Figure 1:
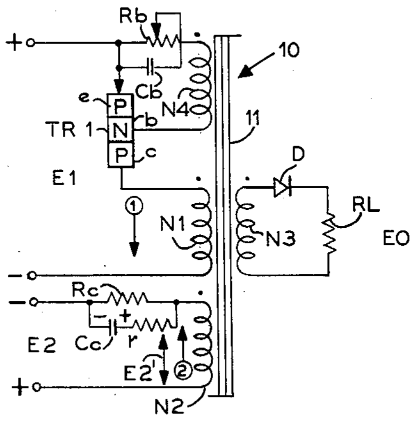
Figure 5:
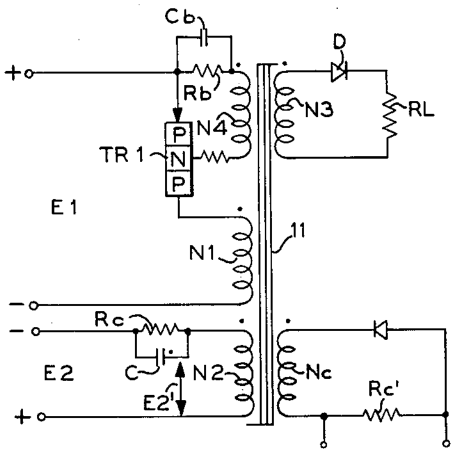
Figure 6:
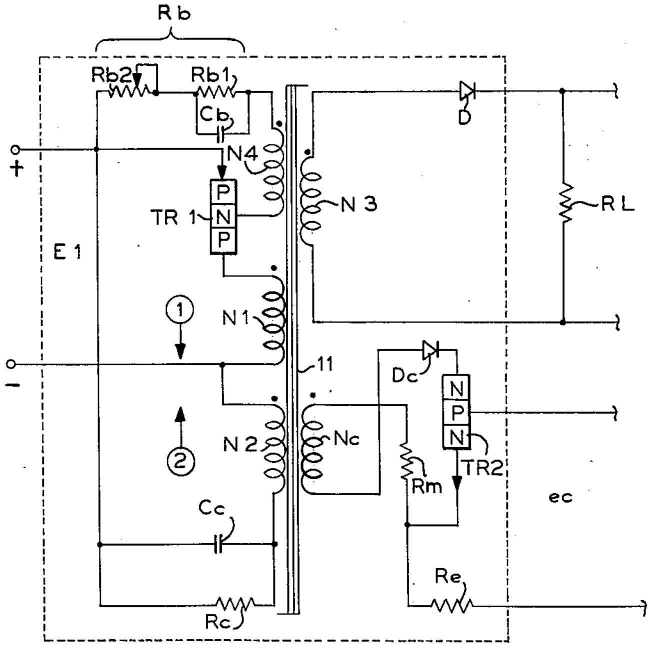
Figure 8:
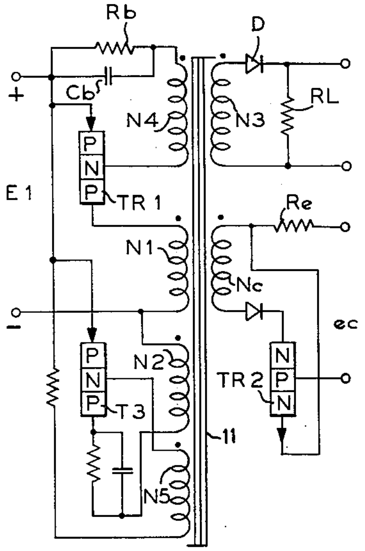
Figure 7:
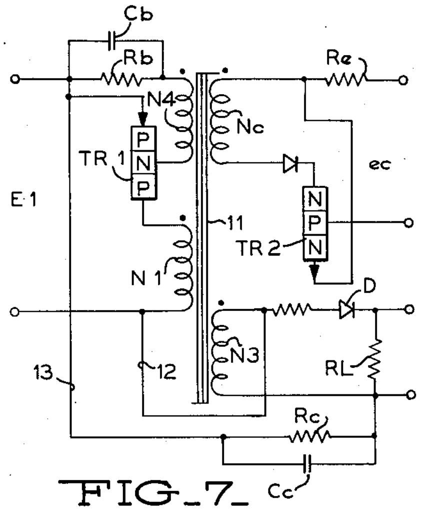

In the drawings:

FIG. 1 is a schematic diagram of a magnetic multivibrator amplifier embodying the principles of the invention in one of its forms, FIGS. 2 and 3 are side elevation and plan views, respectively, of a toroidal core, such as is used in the magnetic amplifier multivibrator of FIG. 1, FIG. 4 shows a characteristic output curve for the multivibrator of FIG. 1, FIG. 5 is a schematic diagram of a magnetic multivibrator embodying the features of the invention in a different form, FIG. 6 is a schematic diagram of a magnetic multivibrator embodying the invention in yet another of its forms, FIG. 7 is a schematic diagram of yet another form of the multivibrator embodying the invention, and FIG. 8 is a schematic diagram of a magnetic multivibrator embodying the invention in yet another one of its forms.

Referring particularly to FIG. 1 of the drawings, the reference numeral 10 designates a magnetic multivibrator amplifier having a magnetic core member 11 of a substantially rectangular hysteresis loop material, such as Orthonol or Deltamax, comprising on the order of 50 percent nickel and 50 percent iron, and which may have a toroidal form as shown in FIGS. 2 and 3. The core 11 is provided with a plurality of windings including an input winding N1, a reset winding N2, an output winding N3, and a base control winding N4.

The input winding N1 is connected by means of a transistor TR1 to a suitable source of direct current voltage, such as a battery or the like, designated by the reference E1 to provide a substantially constant voltage drive for effecting positive saturation of the core 11. The reset winding N2 is connected to a suitable source of direct current, such as a battery or the like, designated by the reference E2 for driving the core to saturation in the opposite sense for the purpose of resetting flux in the core. Control means comprising an R-C circuit consisting of a resistor R*c* and a capacitor C*c* connected in shunt therewith are connected in series with the reset winding N2 for determining the operating characteristics thereof and providing a substantially constant current reset device. The output winding N3 is connected through a diode D to a load circuit represented by resistor RL for developing a positive output voltage for application to the load circuit. The base control winding N4 is connected in circuit with the base electrode "*b*" and the emitter "*e*" of the transistor TR1 for driving the transistor to saturation through a voltage induced in the winding N4 during saturating of the core 11. An adjustable control resistance R*b* is connected in circuit with the winding N4 for varying the base current, in the circuit, so as to determine the maximum output current of the output winding N3. All or a portion of this resistance R*b* can be shunted by a capacitor C*b* to reduce the switching time of transistor T1 from saturation to cut off and vice versa.

A multivibrator, such as shown in FIG. 1, is found to be free running and to have a substantially rectangular output voltage characteristic, as shown by the curve "*a*" in FIG. 4. The height and length of the positive portions of the output rectangular wave can be controlled by varying the voltage of the source E1, while the height and length of the negative portion of the output wave can be controlled by varying the voltage of the source E2. The value of the output voltages across the winding N3 when the core is approaching saturation in the positive direction is equal to the voltage of the source setting the flux, multipled by the turns ratio, and the duration of this output voltage is the time required to saturate the core in the positive direction, that is, the value of the positive pulse of voltage E*o* across the resistor RL equals $$E1\times\frac{N3}{N1}$$

and T1 equals $$\frac{2\phi mN1}{E1}$$

where $\phi m$ is the flux required to saturate the core in the positive direction. Similarly, when the core is approaching the saturation in the negative direction, the value of the negative pulse blocked by diode $$D \text{ equals } ED=(E2-Is2Rc)\times\frac{N3}{N2}$$

and $$T2=\frac{2\phi mN2}{(E2-Is2Rc)}$$

where I*s*2 is the magnetization current of the reset winding.

When the input winding N1 and the reset winding N2 are connected instantaneously to their respective sources, two modes of operation may result.

(1) If the mmf. of the collector-leakage current is smaller than the mmf. of the current through the reset winding N2, then the voltage of source E2 sets the flux in the direction shown by the arrow 2.

(*a*) While the flux in the core is setting in the direction shown by the arrow 2, the negative pulse voltage induced in the output winding N3 is blocked by the diode D, and the voltage E*o* across the load resistor RL is therefore substantially zero. At the same time, the voltage induced in the base control winding N4 by the change of flux in the core 11 is in a direction to keep the transistor TR1 at the cutoff. However, the voltage drop across the resistor R*c* is equal to the magnetizing current $Is2\times Rc$. The voltage across the reset winding N2 is equal to $E2-Is2\ Rc$.

As soon as the core saturates, the base emitter voltage applied to the transistor TR1 from the winding N4 goes to zero, and an increased collector-leakage current can then flow through the transistor TR1. At the same time, an oscillatory action of R*c* C*c* and the saturated inductance of the reset winding N2 tends to reduce or reverse the current through N2 as follows: When the core saturates, the voltage across N2 tends to go to zero. The current I*s*2 increases very sharply, and all the voltage drop appears across R*c*. However, due to saturated inductance, the same amount of current I*s*2 is forced to flow through N2 even if the voltage across it becomes zero. This current charges the capacitor C*c* to a value near E2 or even exceeding E2 in the polarity shown in FIG. 1. When the energy in the saturated core is completely discharged, a reverse current, a current from ground to C*c*, will flow through N2 if C*c* is charged greater than E2. If the voltage of C does not exceed E2, the current will not reverse, however, the current flow through N2 will be reduced considerably to a value well under I*s*2. A resistance *r* is connected in the circuit in series with the capacitor C to slow down the charging and discharging time of C.

The reversal or decrease of current through N2 will cause the leakage current through the winding N1 to predominate and start setting flux in the direction shown by the arrow 1. The voltage induced in the base control winding N4, due either to leakage current in the input winding N1 or the reverse current in the reset winding N2, is in a direction to drive the transistor T1 to full conduction.

(*b*) During this half cycle when the transistor TR1 is at full conduction and the flux in the core is setting in the direction of arrow 1, the voltage drop across the emitter to collector of the transistor is very small, and the full-applied voltage E is across N1 winding. The output voltage, however, across N3 or across the load resistance $$RL \text{ is } \frac{E1N3}{N1}$$

provided that the saturated voltage drop across TR1 and forward voltage drop across D are negligible. The current through the collector of TR1, $$Ic1 \text{ is } \frac{E1}{RL\left(\frac{N1}{N3}\right)^2}+Is1+Ib\frac{N4}{N1}+\frac{E1}{Rc}\left(\frac{N2}{N1}\right)^2+\frac{E2N2}{RcN1}$$

where I*s*1 is the magnetization current of N1, and the last two terms in this equation are due to currents through the N2 winding. Furthermore, the current through the base of the transistor, I*b* is equal to $$\frac{\frac{E1N4}{N3}-ZebIc}{Rb+Zb}$$

where Z*eb* is the transistor impedance common to the emitter and the base, and Z*b* is the emitter-to-base resistance.

If the proper operation of the device is required to keep the emitter-to-collector voltage drop to a minimum, the value of R*b* has to be chosen so that I*b* multiplied by the gain of the transistor is always greater than I*c*1. Therefore, the base resistance R*b* determines the value of base current and hence the maximum output current of winding N3.

If, for any reason, an attempt is made to draw more collector current through TR1 than the base current I*b* allows, a voltage drop appears across the emitter-collector of TR1. This reduces the voltage across N1 and hence reduces the voltage applied to N3. This in turn causes the transistor TR1 to switch off even for a deviation of one-half volt or so because the capacitor C*b* tends to hold the voltage across R*b*, which it shunts, constant and reflects most of the full voltage decrease directly to the base.

When the core 11 saturates in the direction of arrow 1, the magnetization current I*s*1 starts increasing very sharply. A sudden increase in I*c*1, due to common emitter base impedance Z*eb* and C*b*, causes emitter base voltage to become reversed, so as to reduce I*b* and in turn I*c* to zero. As soon as I*c* starts decreasing, the charge on C*c* in the reset circuit starts supplying the magnetization current to further saturate the core in the same direction. The maximum I*s*1 flows through the core when the voltage across the capacitance C*c* becomes equal to E2 and the voltage across N2 winding becomes zero. However, the energy in the saturated core recharges the capacitance C*c* in the reverse polarity additive to E2, as spikes (FIG. 2), and starts resetting the flux in the direction of arrow 2.

(2) If the mmf. of the collector-leakage current exceeds the mmf. of the current in N2, then the voltage E1 determines the setting of the flux in the direction that is shown by the arrow 1. However, the same events will take place in *b—a* sequence instead of *a—b*.

Referring to FIG. 4, it will be seen from the curve "*a*" that the output of the winding N3 of the multivibrator, such as shown in FIG. 1, has a substantially rectangular characteristic. By keeping the voltage of the source E1 constant and varying the voltage of the source E2, the shape, that is, the length and height of the reset or negative portion of the characteristic may be varied, without changing the shape of the positive portion. Thus, it will be seen that the spacing of the positive portions may be varied, while the positive portions remain unchanged in shape, so as to produce substantially constant volt-second output pulses spaced at different intervals along the time axis in accordance with the value of the control voltage E2.

Referring to FIG. 5, it will be seen that the core 11 is, as shown in FIG. 1, provided with a reset winding N2, an output winding N3, and a base control winding N4, which operate in a manner substantially identical with that described in connection with the multivibrator of FIG. 1. Instead of changing the reset portion of the output characteristic by varying the voltage of the source E2, both E1 and E2 may be fixed, and an additional control winding N*c* is provided on the core 11 in connection with a control impedance R*c*′ for obtaining such control.

The relations of the positive portions of output voltage E*o* being equal to $$\frac{N3}{N1}\times E1$$

and T1 equal to $$\frac{2\phi m N1}{E1}$$

still hold. However, due to transformer action, the value of the reset voltage is changed so that the reset voltage across N2, E2′, is equal to $$\frac{E2-Is2Rc}{1+\frac{Rc}{Rc'}\left(\frac{Nc}{N2}\right)^2}$$

and the duration thereof, T2, equals $$\frac{2\phi m N2}{E2'}$$

and the negative pulses can be controlled while E1 and E2 may be held constant.

Referring to FIG. 6, it will be seen that the core 11 is provided, as before, with an input winding N1, a reset winding N2, an output winding N3, a base control winding N4, and a control winding N*c*. The output winding N3 is connected through a diode D to an output or load resistor RL, and the input winding N1 is connected to a direct current source E1 through a transistor TR1, with the base control winding N4 connected between the base "*b*" and the emitter "*e*" of the transistor TR1, as hereinbefore. The reset winding N2, in this instance, is connected to the source E1 in such a direction as to provide for resetting flux in the core 11, while the input winding N1 is connected in the opposite direction, so as to provide for setting or saturating the core 11. The control winding N*c* is connected through a diode D*c* in circuit with the emitter and collector of a transistor TR2, having its base circuit connected to a source of variable control voltage *ec*.

The multivibrator of FIG. 6 operates in substantially the same manner as the multivibrator of FIGS. 1 and 3, with the input voltage E1 being used both for setting and resetting the core and being of a fixed value. A variable impedance means, in this instance, transistor TR2, is used to control the value of the reset voltage. The applied control voltage *ec* will determine the value of the impedance across N*c* winding and, therefore, the reset voltage across N2′, E2′. The relation, neglecting spikes caused by C*c*, can be expressed as follows:

$$E2'=E1-Rc\left(Is2+\frac{Bec}{Re+h11}\,\frac{Nc}{N2}\right)$$

where B is the current amplification ratio between base and collector currents of the transistor, *h*11 is the input resistance of the transistor, and R*e* is a current limiting resistor in the base circuit. During the reset time, due to transformer action, the current through the control resistance R*c* in circuit with the reset winding will be the sum of the magnetization current I*s*2, and the emitter current through the control transistor multiplied by the turns ration. Thus, the voltage absorbed as flux by the reset winding N2 will be equal to the applied voltage minus the voltage drop across R*c*. Since the total time volt integral required to saturate the core is constant, the smaller this voltage is, the longer it will take to saturate the core. If T1 is defined as the time required to saturate the core in the direction shown by the arrow 1, and T2 is the time required to saturate the core in the opposite direction, as shown by the arrow 2, the average value of output voltage E*o* will be $$T1\left(\frac{E1}{T1+T2}\right)\left(\frac{N3}{N1}\right)$$

By inserting the proper values, we get the following:

$$Eo=\frac{E1\frac{N3}{N1}}{1+\frac{E1N2}{E1-Rc\left(Is2+\frac{BecNc}{(Re+h11)N2}\right)N1}}$$

Referring to FIG. 7, it will be seen that the core 11 is provided with an operating winding N1, a base control winding N4, an output winding N3, and a control winding N*c*, substantially identical to the corresponding windings of the multivibrator in FIG. 6. However, instead of providing a separate reset winding N2, as in the multivibrator of FIG. 6, the output winding N3 is connected by conductors 12 and 13 to the source E1 so as to utilize the voltage of the source to energize winding N3 for resetting of flux in the core 11 during the reset time. In other respects, operation of the multivibrator of FIG. 7 is substantially identical with that of FIG. 6.

Referring to FIG. 8, it will be seen that the core 11 is not only provided with an input winding N1 disposed to be switched by a transistor TR1, and having a base control winding N4 for controlling the base current of the transistor TR1, but it is also provided with an output winding N3 disposed to be connected through a diode D to an output circuit represented by load resistor RL. Likewise, a control winding N*c* is provided having a transistor TR2 to provide for connection to a control source *ec* for controlling the reset time of the core as effected by the reset winding N2. Instead of merely having the reset winding N2 directly connected to the source E1, as was the case with the multivibrators hereinbefore described, connection of the reset winding N2 is effected by through an additional transistor TR3, which provides for switching the winding N2 in very much the same manner as the transistor TR1 switches the input winding N1. A base control winding N5 is provided for applying an induced voltage to the base of the transistor TR3 to drive it to full conduction during resetting of the flux in the core 11. Basically, operation of this multivibrator is substantially the same as described in connection with the multivibrator of FIG. 1, except that the connection of the reset winding N2 is switched by the transistor TR3.

As typical of one example of magnetic amplifier multivibrator, such as a multivibrator has been operated successfully having a toroidal core wound from Orthonol tape of .002 thickness, with a width of 1.11 inches, and having an outside diameter of 2.1 inches and an inside diameter of 1.4 inches, with a mean magnetic length of 14.41 inches. The input winding N1 comprises 200 turns of No. 16 conductor and is connected to a 33 volt direct current source through a type 2N174 transistor TR1. The base control winding N4 comprises 50 turns of No. 22 conductor, and is connected through a control resistor R*b*2 of 50 ohms, in series with an R.-C. circuit, including a 25 ohm resistor R*b*1 and a 5 microfarad condenser $C_b$ in parallel. The reset winding N2 comprises 100 turns of No. 22 conductor, and is connected to the 33 volt source through R.-C. circuit including a 300 ohm resistor $R_c$ and a 1 microfarad capacitor $C_c$. The output winding N3 comprises 118 turns of No. 16 conductor connected through a diode D of the 1N92 type to a load resistor R1 of 1500 ohms. The control winding $N_c$ consists of 200 turns of No. 28 conductor connected through a type F diode D2 to the collector and emitter of a transistor TR2 of the 2N158 type through a 51 ohm and 68 ohm resistors, respectively, for connection to a source of control voltage. Such a multivibrator may have a frequency of vibration of from 600 to 2000 cycles, depending on the control voltage, and may have a positive pulse on the order of from .3 to 1 microseconds duration with a negative pulse of from .1 to 3 microseconds duration.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is clamied is:

1. A free running multivibrator comprising, a magnetic core of a material having a substantially rectangular hysteresis loop characteristic, a plurality of windings on said core including a saturating winding, means including a transistor connecting said saturating winding to a direct current voltage source for driving the core to saturation in one sense, circuit means connecting another one of said windings to apply an induced voltage to the base of the transistor to maintain the transistor conductive during the approach to saturation, means including a rectifier connecting yet another one of the windings to a load circuit for applying a voltage thereto during the time the core is approaching saturation, additional circuit means including a relatively high value linear impedance device connecting still another of the windings to a direct current voltage source to provide a substantially constant current drive for resetting flux in the core after saturation is reached, and means including a rectifier and an impedance device for connecting a different one of the windings to a control source for controlling the reset time of the flux without affecting the saturation time.

2. In a multivibrator, a core of a substantially rectangular hysteresis loop material, a plurality of windings on said core including a saturating winding for setting flux in the core, a transistor connecting the saturating winding to a direct current voltage source and having a base control electrode, circuit means connecting another one of said windings to the base electrode to maintain the transistor conductive during the time flux in the core is setting, means including a transistor and a rectifier connecting yet another one of said windings to a source of control voltage to vary the reset time of flux in the core without varying the setting time, additional means including a rectifier connecting still another one of the windings to an output circuit, and adjustable impedance means connecting yet another one of the windings directly to the saturating winding source to provide a constant current drive for resetting flux in the core.

3. In a multivibrator, a core of a substantially rectangular hysteresis loop material, a plurality of windings on said core including a saturating winding, semiconductor switch means connecting said winding to a direct current voltage source for effecting saturation of the core in one sense, said switch means having a base electrode, circuit means including an R-C circuit connecting a second one of said winding to the base electrode for maintaining the switch meas conductive during the approach to saturation of the core, means including a rectifier connecting a third one of said windings to an output circuit for applying a pulse thereto during the approach to saturation, circuit means including an impedance device connecting a fourth one of said windings directly to said source to provide a constant current drive for effecting reset of flux in the core when saturation is reached, and means including a rectifier and semiconductor switch means connecting a fifth one of said windings to a source of variable control voltage to vary the reset time without effecting the saturating time.

References Cited in the file of this patent

UNITED STATES PATENTS

| | | |
|---|---|---|
| 2,760,088 | Pittman, Jr. et al. | Aug. 21, 1956 |
| 2,826,731 | Paynter | Mar. 11, 1958 |
| 2,849,614 | Royer et al. | Aug. 26, 1958 |
| 2,861,237 | Zelina | Nov. 18, 1958 |